(12) United States Patent
Olcmen et al.

(10) Patent No.: US 7,395,699 B2
(45) Date of Patent: Jul. 8, 2008

(54) SPARK-PLUG LDV, LIF, AND LII PROBE FOR ENGINE FLOW AND COMBUSTION ANALYSIS

(75) Inventors: Semih Olcmen, Tuscaloosa, AL (US); Daniel T. Daly, Tuscaloosa, AL (US)

(73) Assignee: The University of Alabama, Tuscaloosa, AL (US)

( * ) Notice: Subject to any disclaimer, the term of this patent is extended or adjusted under 35 U.S.C. 154(b) by 198 days.

(21) Appl. No.: 11/328,135

(22) Filed: Jan. 10, 2006

(65) Prior Publication Data

US 2006/0206255 A1   Sep. 14, 2006

Related U.S. Application Data

(60) Provisional application No. 60/642,106, filed on Jan. 10, 2005.

(51) Int. Cl.
*G01M 15/00* (2006.01)
(52) U.S. Cl. ..................................... 73/117.2
(58) Field of Classification Search ............ 73/35.01, 73/35.03, 35.06, 35.07, 35.08, 35.09, 35.11, 73/35.12, 35.13, 112, 115, 116, 117.2, 117.3, 73/118.1, 118.2
See application file for complete search history.

(56) References Cited

U.S. PATENT DOCUMENTS

| | | | |
|---|---|---|---|
| 6,122,971 A * | 9/2000 | Wlodarczyk | 73/705 |
| 6,131,465 A * | 10/2000 | Wlodarczyk et al. | 73/715 |
| 6,301,957 B1 * | 10/2001 | Sakaguchi et al. | 73/117.3 |
| 6,622,549 B1 * | 9/2003 | Wlodarczyk et al. | 73/119 A |
| 6,820,488 B2 * | 11/2004 | Lenzing et al. | 73/705 |
| 6,981,406 B2 * | 1/2006 | Willner | 73/116 |
| 7,007,547 B2 * | 3/2006 | Philipp et al. | 73/116 |
| 7,207,214 B1 * | 4/2007 | Wlodarczyk | 73/116 |
| 7,214,908 B2 * | 5/2007 | Wlodarczyk | 219/270 |
| 2002/0134138 A1 * | 9/2002 | Philipp et al. | 73/35.07 |
| 2004/0031326 A1 * | 2/2004 | Lenzing et al. | 73/800 |
| 2004/0057645 A1 | 3/2004 | Willner | |
| 2005/0126262 A1 * | 6/2005 | Popielas et al. | 73/35.12 |

* cited by examiner

*Primary Examiner*—Eric S McCall
(74) *Attorney, Agent, or Firm*—Oblon, Spivak, McClelland, Maier & Neustadt, P.C.

(57) ABSTRACT

A traversable, fiber-optic probe design for flow-related measurements in a production-car IC engine during normal operating conditions may be fitted into an M8 spark-plug hole and traversed as much as 50 mm in an axial direction of the spark plug, allowing measurements inside the engine cylinder including the spark plug location. Components of the laser-based system include on-table optics used to generate laser beams and a data acquisition and reduction system used to extract the information measured from the signal produced by the fiber-optic probe.

32 Claims, 14 Drawing Sheets

| TABLE 1. JET PARAMETERS | |
|---|---|
| EXIT DIAMETER, D (INCHES) | 0.15 |
| EXIT VELOCITY (m/s), $U_j$ | 40 |
| REYNOLDS NUMBER, $Re_D$ | 10,000 |

*Fig. 13*

TABLE 2. COMPARISON OF CONSTANTS

| PARAMETER | PUNCHAPAKESAN AND LUMLEY (1993a) | HUSSEIN ET AL. (1994), HOTWIRE DATA | HUSSEIN ET AL. (1994), LASER-DOPPLER DATA | OUR STUDY |
|---|---|---|---|---|
| Re | 11,000 | 95,500 | 95,500 | 10,000 |
| S | 0.096 | 0.102 | 0.094 | 0.107 |
| Bu | 6.06 | 5.9 | 5.8 | 5.36 |

Fig. 14

SPARK-PLUG LDV, LIF, AND LII PROBE FOR ENGINE FLOW AND COMBUSTION ANALYSIS

CROSS-REFERENCE TO RELATED APPLICATIONS

This application claims the benefit of U.S. Provisional Application No. 60/642,106, filed on Jan. 10, 2005. The entire contents of which are incorporated herein by reference in their entirety.

BACKGROUND OF THE INVENTION

1. Field of the Invention

The present invention relates in general to fluid flow and combustion diagnostics and, more particularly, to fiber-optic probes to aid in the measurements of various parameters in reacting and non-reacting flows.

2. Description of the Related Art

Engineering design of many devices of practical significance rely heavily on the availability of experimental data for either validation of computer-aided design or information on controlling phenomena to aid in the design process. For example, in many and most applications involving reacting and non-reacting flows, information about three-dimensional flow velocity, concentration fields of various species, and temperature are important variables to know in order to properly predict flow behavior in, for example, automobile engines, gas turbines, industrial furnaces, and many other applications.

In the past intrusive probes were used to make measurements, but the introduction of probes in the flow fields raises questions on the accuracy of the data collected. In order to minimize flow disturbance due to measurements, many laser-based experimental techniques have been developed, as for example, Laser Doppler Velocimeter or Anemometry, LDV or LDA; Phase Doppler Particle Analyzer, or PDPA; Particle Image Velocimetry, or PIV, Laser Induced Florescence, or LIF; Laser Induced Incandescense, or LII; and Coherent Anti-Stokes Raman Spectroscopy, or CARS. However, in view of the many supporting devices needed to make these laser-based techniques to work combined with the difficulty in accessing the flow field to be studied, in many applications, an optical probe is needed to collect measurement information to be further processed into useful data. Although the following discussion will use an automobile engine as an example, those of ordinary skill in the art will appreciate that the instant invention is equally applicable to other engineering application areas, such as, but not limited to, gas turbine engines, air and water flows, industrial furnaces, and boilers, to name a few.

Engine performance is influenced by many factors, such as the combustion chamber design, intake exhaust ports design and location, combustion process, turbulence intensity in-cylinder, fuel-air mixing process, etc., and much research has been devoted to investigate these effects on the Internal Combustion, or IC, engine behavior. However, the flow field inside the cylinder of an IC engines is still not well understood due to the complexity of the flow and also due to the lack of experimental instrumentation. The flow characteristics inside the cylinder of IC engine can be summarized as follows: (1) unsteady or non-stationary as a result of the reciprocating piston motion; (2) turbulent at all engine speeds and inlet port/cylinder dimensions; (3) three dimensional as a result of the engine geometry; (4) as having local variations from cycle-to-cycle; (5) as having time scales associated with the bulk flow variations of the same order as the turbulent time scales; and (6) spatially confined by time-varying flow boundaries of rather complex geometry.

In-cylinder flow characteristics of IC engines play a crucial role in engine performance since it affects the combustion process, and thus the efficiency of the engines directly. Understanding the flow physics of in-cylinder motions, such as tumble and swirl, requires the measurement of velocity distribution, turbulent intensity within the engine cylinder and other parameters. In this vain many researchers have employed different experimental and computational techniques, including hot-wire anemometry, Particle Tracking Velocimetry, or PTV, PIV, and LDA techniques. Among these techniques, as noted by Arcoumanis and Whitelaw (C. Arcoumanis and J. H. Whitelaw "Fluid Mechanics of Internal Combustion Engines: A Review", International Symposium on Flows in Internal Combustion Engines-III., Vol. 28, ASME 1985, the entire contents of which are hereby incorporated by reference) LDA has been widely used since the LDA can be easily adapted to study flow fields within hard to reach geometries such as the valve exit flow, and the flow inside complex bowl-piston configurations. LDA has also been successfully employed to identify the flow affects on combustion within the engine cylinders (Id.). LDA, similar to the other optical technique, allows non-intrusive measurements of the flow field.

Computation of in-cylinder flows prove to be difficult due to the lack of turbulence models, further experimental data is required to improve predicting capability of computational codes. There is a need for further experimental data at several points in different planes inside the cylinder to further understand the flow behavior inside the cylinder effectively. Investigation of such a flow requires special instruments and several such instruments have been developed by the researchers over the years, as briefly summarized herein below.

NeuBer et al. (H-J. NeuBer, L. Spiegel and J Ganser, "Particle Tracking Velocimetry-A Powerful Tool to Shape the In-Cylinder Flow of Modern Multi Valve Engine Concepts," SAE Paper, 950102, 1995, the entire contents of which are herein incorporated by reference) have used a PTV technique to analyze in cylinder flow. Their study was aimed to parametrically study the effect of the intake port configurations. They tested port configurations resulting in high and low tumble levels or in different levels of swirl. The authors have investigated the tumble levels, turbulent intensity and the transient flow structure related processes in the combustion chamber, and they observed that, since the intake ports induce the formation and development of the tumble, the design of the intake ports is important for controlling the in-cylinder flow. Patrie and Martin (Mitchell P. Patrie and Jay K. Martin, "PIV Measurements of In-Cylinder Flow Structures and Correlation With Engine Performance", ICE-Vol. 29-3, 1997 Fall Technical Conference, ASME 1997, the entire contents of which are herein incorporated by reference) have also investigated the effects of the design of intake ports on producing swirl and/or tumble motions in the cylinder of engines by using PIV technique, and they also observed that in-cylinder flow field turbulence can enhance combustion, yielding shorter burn times, reducing emissions, and improving fuel economy.

Lee et al. (Ki Hyung Lee and Chang Sik Lee Hyun Jong Park and Dae Sik Kim, "Effects of Tumble and Swirl Flows on The Turbulence Scale Near the TDC in 4 Valve S.I. Engine", ICE-Vol. 36-2, 2001 ICE Spring Technical Conference—Vol. 2, ASME 2001, the entire contents of which are herein incorporated by reference) have investigated the effects of the design of the combustion chamber and the intake manifold on the flow characteristics inside the cylinder of a laboratory IC engine. They developed single frame PTV and two color PIV systems to investigate the influences of the swirl and the tumble intensifying system on the in-cylinder flow characteristics under the various intake geometries.

Vigor et al. (H. Vigor, J. Pecheux, and J. L. Peube, "Velocity Measurements Inside The Cylinder of An Internal Combustion Model Engine During The Intake Process", Laser Anemometry, Vol. 1, ASME 1991, the entire contents of which are herein incorporated by reference) have focused on the flow field near the walls of the internal combustion chambers. They used LDA to measure the boundary layer flow on the cylinder walls during the intake process on a laboratory engine. Measurements were made while the intake velocity was constant, which resulted in a flow field without the swirl within the engine. Their measurement of the axial velocity and the turbulent kinetic energy profiles at different regions of the cylinder revealed that the boundary layer was two dimensional in nature. Flow visualization results also confirmed this observation.

Himes and Farell (Michael R. Himes' Patrick V. Farell, "Laser Doppler Velocimeter Measurements within a motored Direct Injection Spark Ignited Engine", ICE-Vol. 31-2, 1998 Fall Technical Conference ASME 1998, the entire contents of which are herein incorporated by reference) studied the affect of the in-cylinder flow on the mixing process in an engine operated as a direct injection spark ignited engine. They used LDV technique to quantify the velocities and the turbulence levels in the regions where the fuel would be injected additional to the measurements at several different locations.

Beside experimental works, computational works have also been performed to understand the flow behavior inside the cylinder of engines. The most famous code developed for this purpose is known as KIVA-3. Kong and Hong (Song-Charng Kong Che-Wun Hong, "Comparison of Computed and Measured Flow Processes in A Four Stroke Engine", ICE—Vol. 29-2, 1997 Fall Technical Conference, ASME 1997, the entire contents of which are herein incorporated by reference) used the KIVA-3 code with improved submodels they developed to investigate the flow structures, velocities, and turbulent parameters, by assuming that turbulent intensity is 10% of the mean inlet velocity, and the inlet turbulent integral scale is 10% of the intake pipe diameter. Authors compared their computational results with the experimental data obtained using LDA technique, and they showed that the comparisons of computed and measured flow velocities at three different cross sections agreed reasonably well. The agreement of the computed and measured integral length scales were satisfactory once the complexity of the engine turbulence is taken into account. In another computational work, the Conchas-Spray model was used by Kuo and Duggal (T. W. Kuo and V. K. Duggal, "Modeling of In-Cylinder Flow Characteristics-Effect of Engine Design Parameters", Flows in Internal Combustion Engines-II, ASME 1984, the entire contents of which are herein incorporated by reference) to investigate the flow characteristics and the effects of the different piston bowl shapes on the flow behavior.

Many parameters, such as the combustion chamber geometry, intake port valve/manifold geometry and location, affect the flow turbulence, swirl, tumble and the flow velocities. The flow parameters in turn affect the fuel-air mixing, and the combustion processes (flame speed), which are directly related to the efficiency and the emissions of the engine. As noted by Rask (Rodney B. Rask, "Laser Doppler Anemometer Measurements in an Internal Combustion Engine", SAE Paper, 790094, 1979, the entire contents of which are herein incorporated by reference) measurements of the flow variables in engines with different configurations are required to improve their efficiencies.

For better understanding the flow inside the cylinder, researchers have developed novel probes that can be used in off-the-shelf operating engines. Ikeda et al. (Ikeda, Y., Nishihara., H., Nakajima, T., 2000, "Spark plug-in Fiber LDV for Turbulent Intensity Measurement of Practical SI Engine", $10^{th}$ International Symposia on Applications of Laser Techniques to Fluid Mechanics, July 10-13, Lisbon, Portugal, the entire contents of which are herein incorporated by reference) and Kim et al. (Kim, B., Kaneko, M. and Mitani, M., Y. Ikeda and Nakajima, "In-Cylinder Turbulent Measurements with a Spark Plug-In Fiber LDV", $11^{th}$ Symposia on Applications of Laser Techniques to Fluid Mechanics, July 8-11, Lisbon Portugal, the entire contents of which are herein incorporated by reference) have developed a non-traversable LDV probe which could fit into M14 size spark plug to measure turbulence at the spark plug location under motored engine conditions. Bopp et al. (Bopp, S., Durst, F., Tropea, C., "In-Cylinder Velocity Measurements with a Mobile Fiber Optic LDA System", SAE Paper, 900055, 1990, the entire contents of which are herein incorporated by reference) have designed fiber optic, one component LDV probe to investigate the flow characteristics inside the research engine.

Due to the high pressures and temperatures obtained during the combustion process, measurements with these techniques are usually accomplished in motored engines, in cold flow conditions and at engine speeds lower than the operation speeds of the commercial engines. Reviews of the recent state-of-the-art techniques used in flow field investigation of fired production engines are reported in the literature. See, for example, Hassel and Linow (Hassel, E. P. and Linow S., 2000, "Laser diagnostics for studies of turbulent combustion", Meas. Sci. Technol. 11 (2000) R37-R57, the entire contents of which are herein incorporated by reference) Zhao and Ladommatos (H. Zhao and N. Ladommatos, 1998, "Optical Diagnostics for In-cylinder Mixture Formation Measurements in IC Engines", *Prog. Energy Combust. Sci.* Vol. 24, pp. 297-336, the entire contents of which are herein incorporated by reference), Kuwahara (K. Kuwahara, 2003, "In-Cylinder Phenomena Diagnostics for Gasoline Engine Development", Technical Review, vol 15., pp. 21-31, the entire contents of which are herein incorporated by reference), and Kuwahara and Ando (Kuwahara and H. Ando, 2000, "Diagnostics of in-cylinder flow, mixing and combustion in gasoline engines", *Meas. Sci. Technol.* Vol. 11, pp. R95-R111, the entire contents of which are herein incorporated by reference). These papers point to the fact that very expensive engines with very specialized optical access ports are required for laser-based diagnostics, and the measurements can only be made in reduced RPM conditions. In addition, conventional probes are not traversable, are not capable of measuring two- or three-components of velocity, comprise many moving parts, are not suitable for making measurements in production car engines, and are not designed using off-the shelf optical components.

Therefore, based at least on the foregoing summarized discussion, a need exist for a miniature, fiber-optic, traversable probe. This novel, fiber-optic probe includes several unique capabilities, including, as non-limiting examples: (1) miniature, fiber optic, two component LDV capability; (2) traversable along the spark-plug axis for measurements at several point; (3) suitable for measurements in production car engines; (4) capable of measuring shear stresses and normal stresses both in cold and hot flows; and (5) designed using off-the shelf optics, without any moving parts which makes the probe suitable for very cramped, and highly vibrational environments. In one embodiment, the probe fits into a spark plug opening in an operating off-the shelf car engine, and is capable of measuring two velocity components simultaneously in the directions perpendicular to the spark plug axis at several points including the spark plug location within the cylinder.

SUMMARY OF THE INVENTION

A fiber-optic probe configured to make flow-related measurements inside a cylinder of an automobile engine during normal operations includes an external body configured to be inserted into an access port in the engine; a transparent window disposed in the external body; a traversable middle section inserted through the external body; and a data acquisition system. The middle section further includes receiving and transmitting fibers connected to a fiber terminator, a transmitting lens to focus a laser light from the transmitting fiber so as to form a probe volume inside the engine beyond the transparent window, and a receiving lens to focus a scattered light from the probe volume into the receiving fiber, the data acquisition system being connected to the receiving fiber via a fiber-optic cable and configured to compute the flow-related measurements from the light scattered from the probe volume. In the various embodiment disclosed and their variations within the scope of the invention, the disclosed fiber-optic probe may be configured to make LDV, LIF, LII, or CARS measurements inside the cylinder of the engine.

In another embodiment of the invention, a fiber-optic probe configured to make flow-related measurements inside the cylinder of an automobile engine during normal operations includes an external body configured to be inserted into an access port in the engine; a transparent window inserted in the first end portion of the external body; and means for traversably making the flow-related measurements inside the cylinder of the engine. In the various embodiment disclosed and their variations within the scope of the invention, the means for traversably making the flow-related measurements inside the cylinder of the engine comprises means for making LDV, LIF, LII, or CARS measurements.

A method of making flow-related measurements inside a cylinder of an automobile engine during normal operations with a fiber-optic probe is also within the scope of the disclosed invention, the method including: providing the automobile engine; inserting the optic probe into the access port in the engine, the optic probe including an external body configured to be inserted into an access port in the engine; a transparent window disposed in the external body; a traversable middle section inserted through the external body; and a data acquisition system, the middle section further including receiving and transmitting fibers connected to a fiber terminator, a transmitting lens to focus a laser light from the transmitting fiber so as to form a probe volume formed inside the engine beyond the transparent window, and a receiving lens to focus a scattered light from the probe volume into the receiving fiber, the data acquisition system being connected to the receiving fiber via a fiber-optic cable and configured to compute the flow-related measurements from the light scattered from the probe volume; operating the automobile engine during normal operations; shinning the laser light through the transmitting fiber; collecting the scattered light from the probe volume with the data acquisition system; and computing with the data acquisition system the flow-related measurements based on the light scattered received by the data acquisition system via the fiber-optic cable.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 13 shows experimental conditions for the jet flow measurements of FIG. 5; and FIG. 14 shows a comparison of spreading rate and decay constants used in the present study compared to those found in previous works used by others.

DETAILED DESCRIPTION OF THE PREFERRED EMBODIMENTS

Figure 1:
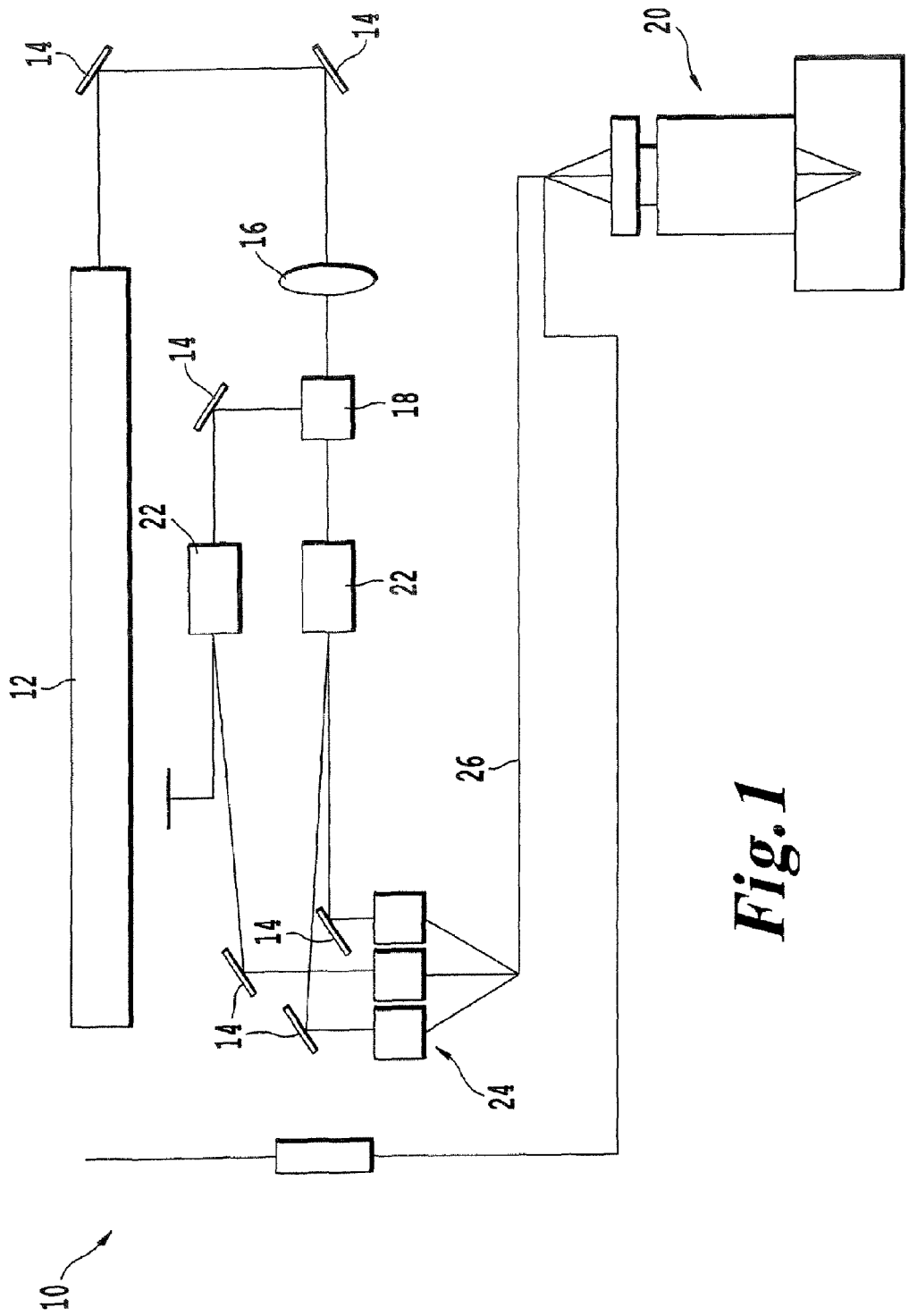
FIG. 1 illustrates a schematic of an on-table optical equipment for use with one embodiment of the optical probe of the invention.

Referring now to the drawings, wherein like reference numerals designate identical or corresponding parts throughout the several views, one of the embodiments of the optical probe of the invention will be described. One of the advantageous aspects of an embodiment of the invention described here is a novel fiber-optic probe that fits into a spark plug opening in an operating off-the shelf car engine. The probe is capable of measuring the fluid dynamics of turbulent mixing, soot formation and fuel vaporization in the cylinder by using different laser sources. One of the advantageous features of the device is its capability to use a laser light sources coupled to fiber-optic cables to transfer light to the probe head and to record emissions resulting from the laser light source. One of the benefits of this technique is that it is capable of making measurements on an operating car engine. The probe can be used to parametrically study the in-cylinder turbulence, soot formation and fuel vaporization in production engines. Areas of application of the several embodiments of the probe of the invention include, but are not limited to, Aerospace Engineering, Mechanical Engineering, Fluid Mechanics, Combustion, Turbulence Fuel Vaporization, and Emissions.

FIG. 1 illustrates the fiber-optic probe 20 configured for measurements in an LDV system 10. The LDV system 10 includes on-table optics, the probe 20, and data acquisition and reduction units. In one embodiment, the on-table optical equipment is used to generate three laser beams required for the velocity measurements and to couple them to fiber-optic cables to transfer them to the probe head. The probe head is used to generate the measurement probe volumes and to collect the scattered light from the particles within the flow. Scattered light is further transferred to the data-acquisition and reduction units using a fiber-optic cable.

The on-table optics schematic of one of the preferred embodiment is shown in FIG. 1. An Ar-Ion laser (e.g., Spectra-Physics Beamlok-2080-15S) with a maximum output of 15W-all-lines is used as the laser light source 12. Those of ordinary skill in the art will understand that there are other laser light sources that will work equally well with different embodiments of the optical probes of the instant invention. The laser beam with a diameter of 1.9 mm with a perpendicular polarization direction emerging from the laser first reflects from two mirrors 14 to allow the use of the on-table space. The laser beam next passes through a polarization rotator 16 and a polarizing-beam-splitter couple 18, which acts as a variable intensity beam-splitter, while the beam passing through in the beam splitter polarization direction is perpendicular the polarization of the reflected beam becomes horizontal. Next the two beams thus obtained are passed through two separate Bragg cell units 22 (e.g., Intra-Action AOM-40 and Intra-Action AOM-50). The Bragg cells 22 further split each of the beams into two separate beams while the zeroth order beam passes through without a frequency shift. The first order beam emerging from the Bragg cell experiences a Bragg shift by the prescribed frequency shift. In one of the embodiments of the present invention, three out of the four beams emerging from the Bragg cells may be used with 0, 40 and -50 MHz frequency shifts. The laser beams are next coupled to polarization-maintaining optical fibers 26 (e.g., Corning® PM 48-P-S) using laser-to-fiber couplers 24 (e.g., Newport, F-91-C1) equipped with five-axis adjustment capability.

Figure 2A:
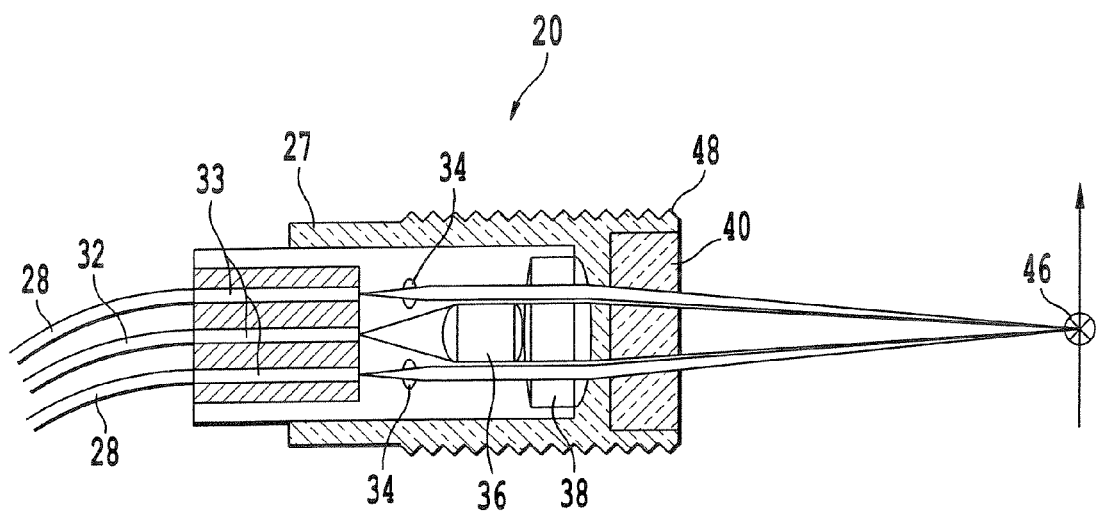
FIG. 2 illustrates a schematic diagram of one embodiment of the miniature probe of the invention for velocity measurements, including the probe (FIG. 2A) and the disposition of the laser beams forming the probe volumes (FIG. 2B)
Figure 2B:
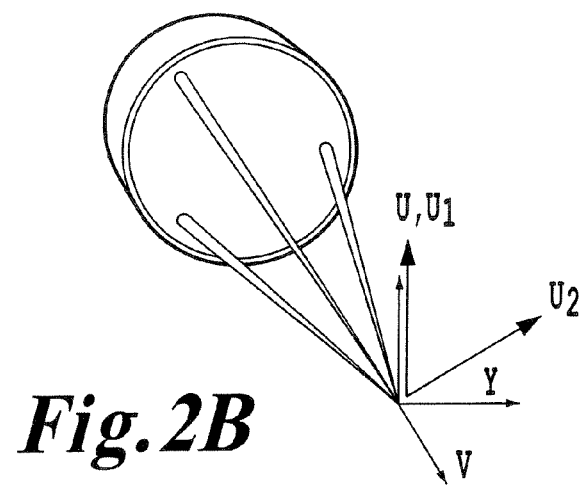

In this embodiment, the probe 20 includes transmitting and receiving fiber terminators 33, several lenses 34, 36, and 38, and a sapphire insert glass 40 (FIG. 2) disposed in a machined spark plug 27. The three green beams are generated by the on-table optics and are transferred to the probe head by optical fibers 28 and 32. As illustrated, the ends of the fibers 28 and 32 which transfer the laser beams to the probe 20 are terminated separately in fiber terminators 33. Fiber terminators 33 may be placed as if they were at the corners of an equilateral triangle, as shown in FIG. 2B, but are not limited to such an arrangement, which is determined by the type of measurements intended. Beams emerging from the terminators 33 pass through separate lenses 34 for collimation. Next, all the collimated beams pass through a lens 38 that focus them to form measurement probe volumes 46. Each probe volume 46 is formed by interference of two beams and the probe volumes 46 are ellipsoidal in shape.

In this embodiment, the receiving optics train 36 is also housed in the probe 20. The light scattered by the particles passing through the measurement probe volumes is collected by two lenses 38 working in tandem and is focused to the receiving optical fiber 32. An achromatic lens of the transmitting optics together with a plano-convex lens is used as the receiving optics 36 to collect the scattered light from the probe volumes 46. Multi-mode, 50-µm-core-diameter receiving fiber is used to transfer the collected light to the data acquisition unit (not illustrated).

The design of the probe 20 in the above-described embodiment allows measurements of velocities of up to 50 mm away from the sapphire insert glass 40 with a resolution of 70 µm (FIG. 2). In such an embodiment of the probe 20, the transmitting lens 38 has a focal distance of 60 mm and a diameter of 10 mm, the receiving lens 36 has a focal distance of 10 mm and a diameter of 5 mm, and the collimating lens 34 has a focal distance of 3 mm and a diameter of 3 mm. With such optical system, a fringe spacing of 4.86 µm is obtained in a probe volume 46 that is 70×70×1337 µm with an overall size of 30 mm long with a 15 mm diameter.

The probe 20 may also be configured to be secured to a spark-plug opening via external threads 48. In this preferred embodiment, there are no adjustment screws for aligning each individual beam, however high precision machining may be required for this purpose. Due to its low-profile, sub-miniature, self-aligning and non-moving parts design, the probe is one of the smallest designs available for this purpose. A mid section of the probe 20 may be traversed with a single traversing mechanism (not illustrated) (e.g., National Aperture MM-3M-Ex-2). In another embodiment, as shown in FIG. 2A, the optic probe 20 is inserted into a machined spark plug 27 before installing it in the engine.

A similar embodiment for LIF measurements may be used except for the use of a laser that can emit light at 308-nm wavelength. Such a LIF probe would be used for fuel vaporization during cold temperature start-up conditions. A dopant could be place in the fuel. In addition, a similar embodiment could be used for LII measurements in which a laser emitting a high-energy pulse for soot irradiation and detection may be used.

Velocity components $U_1$ and $U_2$ and U, V velocity components measured by the probe 20 may be calculated using the following relations:

$$U_1 = U \quad (1)$$

$$U_2 = U^* \sin(Y) + V^* \cos(Y). \quad (2)$$

The Y angle between the measured $U_2$ component and the V velocity component may be directly measured by measuring the angles between the laser beams emerging from the probe head.

Figure 3:
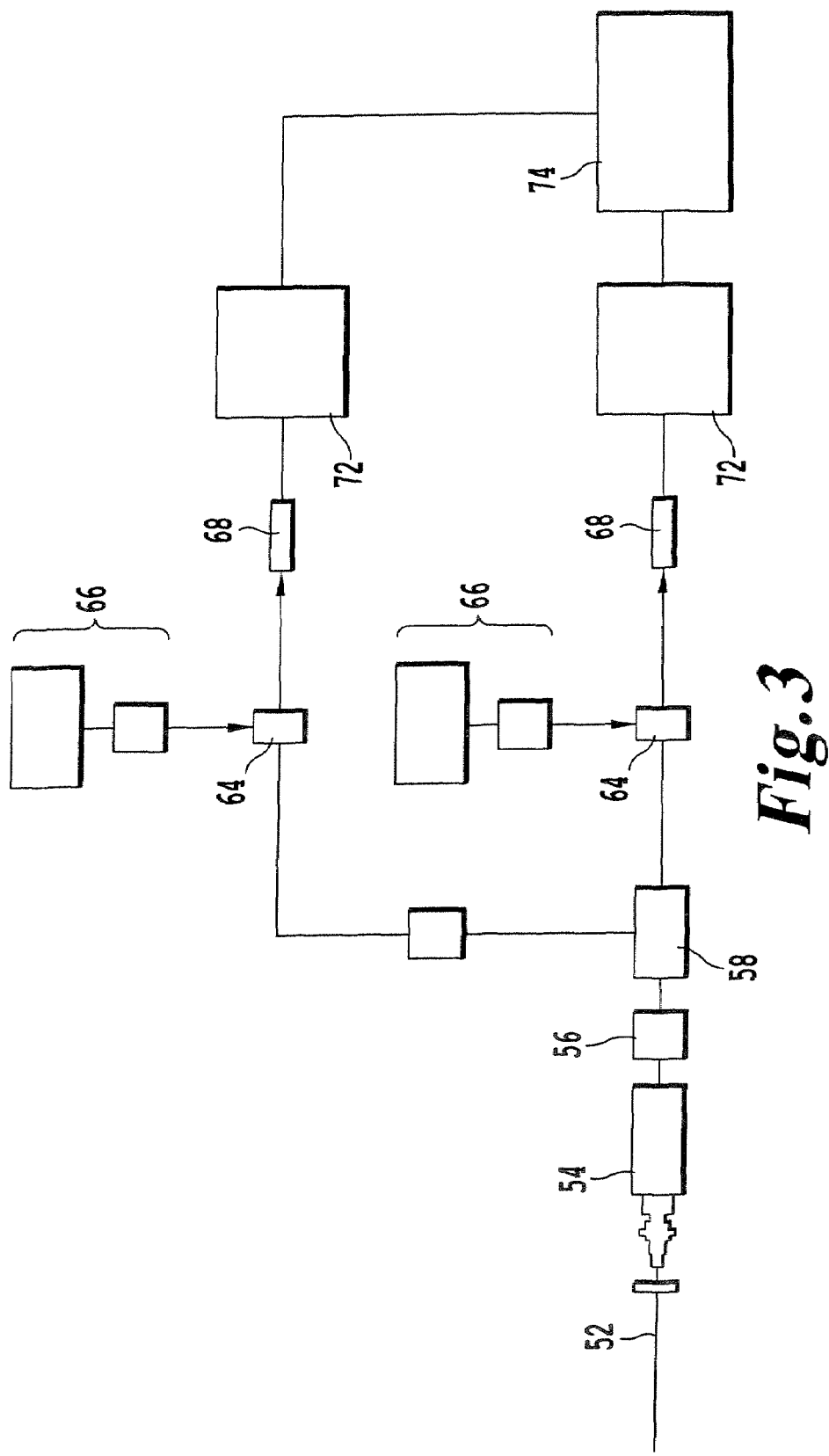
FIG. 3 illustrates a schematic diagram of the data acquisition system of one of the embodiments of the invention.

As shown in FIG. 3, the scattered light from the in-flow particles collected by the probe 20 is transferred to a data acquisition and reduction unit 40 by use of a 50-μm core diameter multi-mode fiber-optic cable 52. The light emerging from the fiber is directly coupled into a photo-multiplier tube 54 (e.g., *Electron Tubes*, 9124SB) to convert the light information to an electrical signal. The signal is next amplified by an amplifier 56 and split into two electrical signals using a power splitter 58 since both the 40 MHz and the 50 MHz shifted signal are present within the signal right after the photo-multiplier tube 54. Next the frequency added to each signal by the Bragg cells are subtracted from the electrical signal with the use of mixers 64 and radio-frequency generators 66 (e.g., B&K 2005B RF). The signals may then be filtered by filters 68 and fed to frequency domain processors 72 (e.g., TSI-FSA-4000) to extract the Doppler frequency information.

Although frequency domain processors 72 may be equipped with three-simultaneous velocity measurement capability, only two channels may be used. However, those of ordinary skill in the art will understand that a probe for three-dimensional velocity measurements is within the scope of the disclosed invention. As further illustrated in FIG. 3, each frequency domain processor 72 may be placed in communication with a data-acquisition computer 74 using, for example, a USB port. Exemplary measurements using one of the embodiments of the present invention will now be described for velocity measurements in a jet flow and in an automobile engine. It is to be understood that these are non-limiting examples and that those of ordinary skill in the art will understand that other embodiments to measure other flow parameters are within the scope of the present invention. For example, design variations within the scope of this invention include optical probes capable of measuring species concentrations; droplet size, number density, and droplet velocity in three directions; and temperature in reacting and non-reacting single phase and two-phase flows.

The exemplary probe was tested in a well defined jet flow to demonstrate that it could measure velocities correctly and that it could be used to measure the velocities in working IC engines. A back-scatter light collection scheme is used to measure the velocities for the jet flow. Two-simultaneous velocity component measurements are performed at different distances from the jet nozzle exit and at each axial location the probe is traversed in the radial direction to obtain the axial and radial normal stresses and mean velocities and the Reynolds stress. The results for the jet flow are compared with previously published results.

Figure 4:
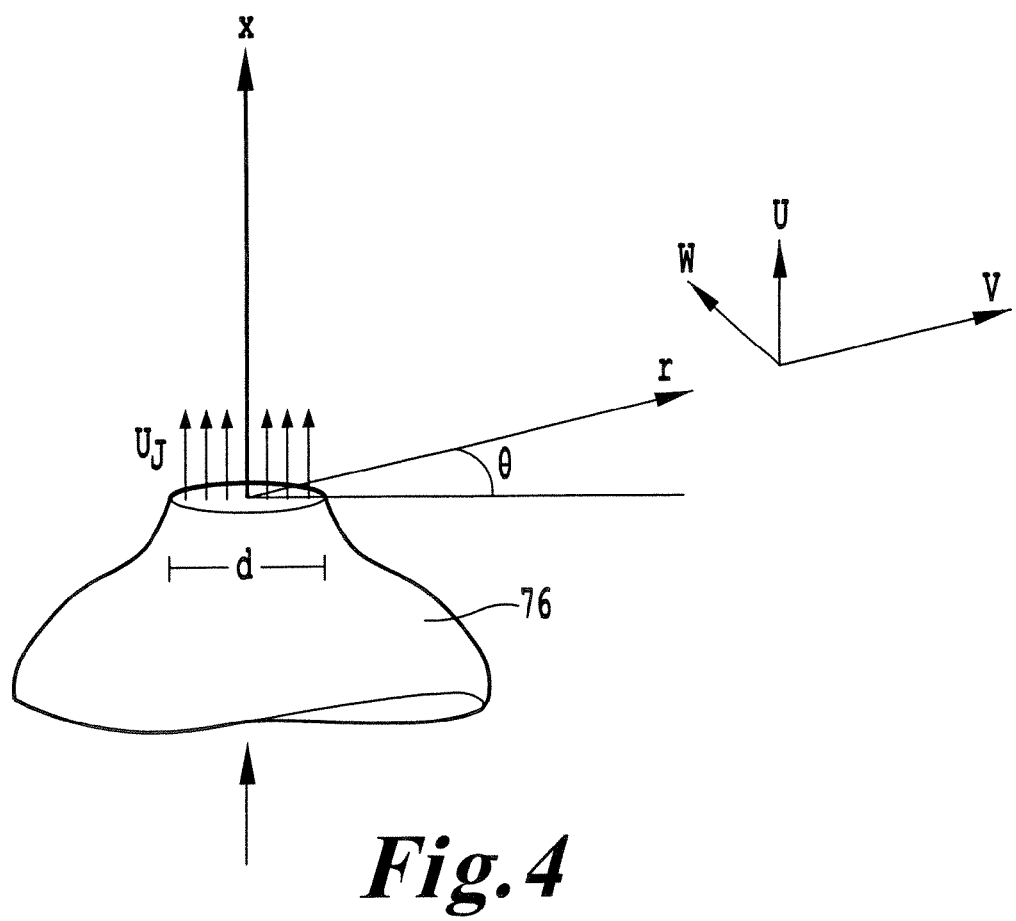
FIG. 4 illustrates a schematic diagram of a round jet studied using an embodiment of the optical probe of the invention.

A schematic of the jet flow studied and the coordinate system used in the study is shown in FIG. 4. The velocity components in x, r, and θ coordinate directions are U, V, W respectively. Jet characteristics of the jet flow field is a function of the jet velocity; $U_j$, the diameter, D, of the nozzle 76; and kinematical viscosity v, which are related to each other with the Reynolds number, Re=$U_j$d/v. The parameters of the jet flow are given in FIG. 13.

Figure 5:
FIG. 5 illustrates an experimental setup for measurements of the jet flow illustrated in FIG. 4.

The jet flow was generated with TSI Model 1125 Gas probe calibrator (FIG. 5). This model provides a calibrated chamber flow based on the Bernoulli's equation. The LDV Probe attached to a probe holder was held by a traversing mechanism, which provided the movement in the radial direction of the jet flow. By sliding the probe holder, the distance from the jet flow could be changed. The experimental set-up is shown in FIG. 5. The seeding particles (DOP) were introduced into the calibrator settling chamber. Measurements were made using backscattering technique.

Experiments were performed at different axial distances from the jet exit in order to measure the axial velocity profile of the jet flow. The LDV probe has also been traversed in radial direction at each location to obtain the radial velocity profile of the jet.

The centerline velocity normalized with the exit velocity of the jet can be expressed as:

$$\frac{U_o}{U_j} = \frac{1}{B_u}\left[\frac{x}{D} - \frac{x_o}{D}\right], \quad (3)$$

where $B_u$ is an empirical velocity decay constant, D, is the exit diameter.

Figure 6:
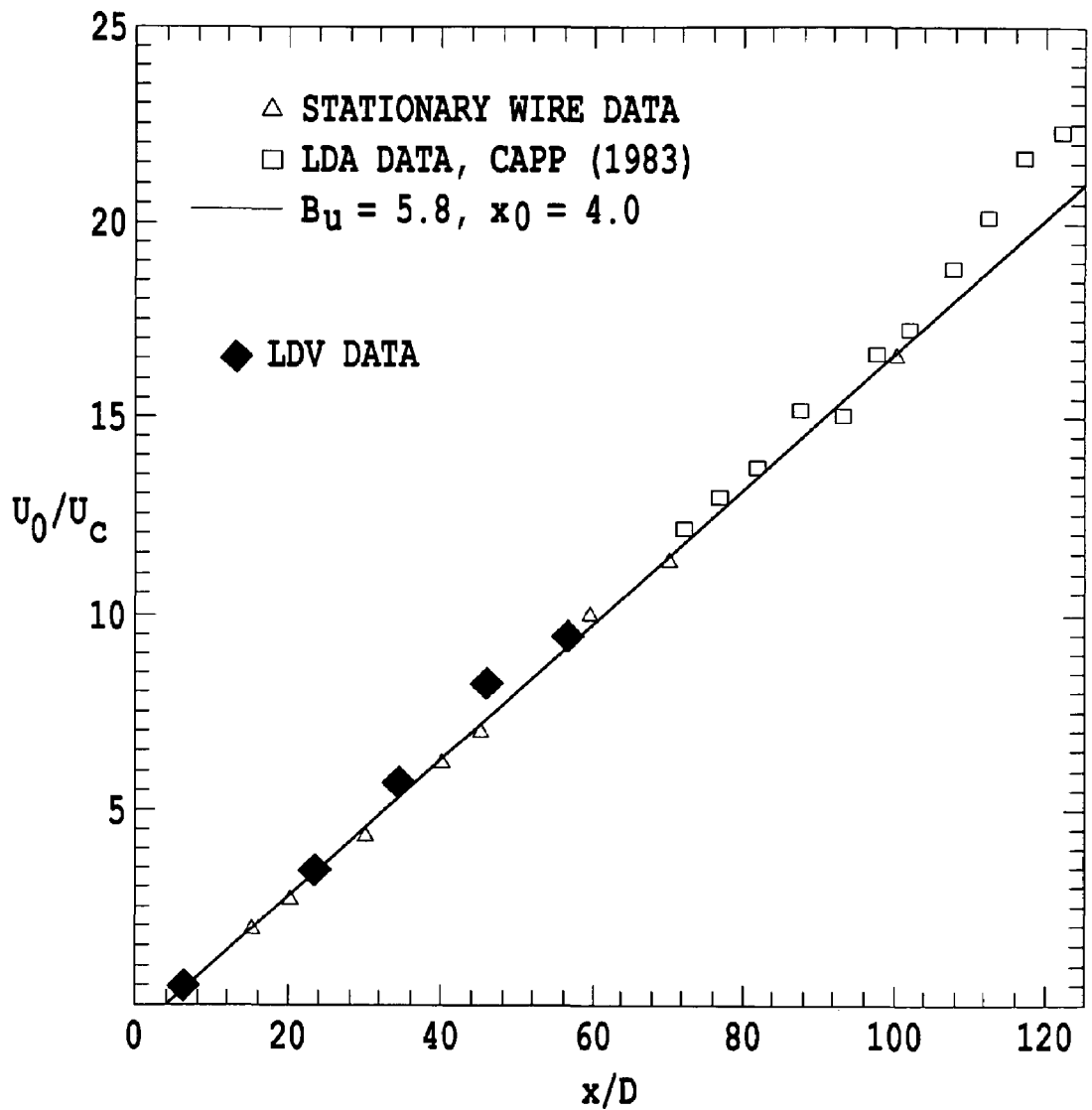
FIG. 6 illustrates the variation of mean axial velocity along the centerline in the jet flow measurements illustrated in FIG. 5, including experimental data of other researchers.

FIG. 6 shows the relationship between normalized centerline velocity, $U_j/U_o$, and normalized axial distance, x/D. The straight-line behavior is constituted after the developing region, which is approximately after $x_0/D=20$. As it is seen from the figure, the agreement between LDV data and previous experimental data was achieved. There is a 7.5% difference between decay constants. This difference is attributed to the number of data, which are much less than the data found in the previous work.

The jet spreads linearly and the spreading rate can be written, according to Pope (S. B. Pope, 2000, *Turbulent Flows*, Cambridge University Press, USA, UK, Australia, Spain, South Africa, the entire contents of which are herein incorporated by reference) as $$S \equiv \frac{dr_{1/2}}{dx}, \quad (4)$$

where $r_{1/2}$ is the half width and can be found by using empirical law $$r_{1/2}(x) = S(x-x_0) \quad (5)$$

The spreading rate and decay constants are compared with those found in previous work in FIG. 14. In ideal round jet experiment, the velocity decay constant $B_u$, and the spreading rate S does not vary with Re.

Figure 7:
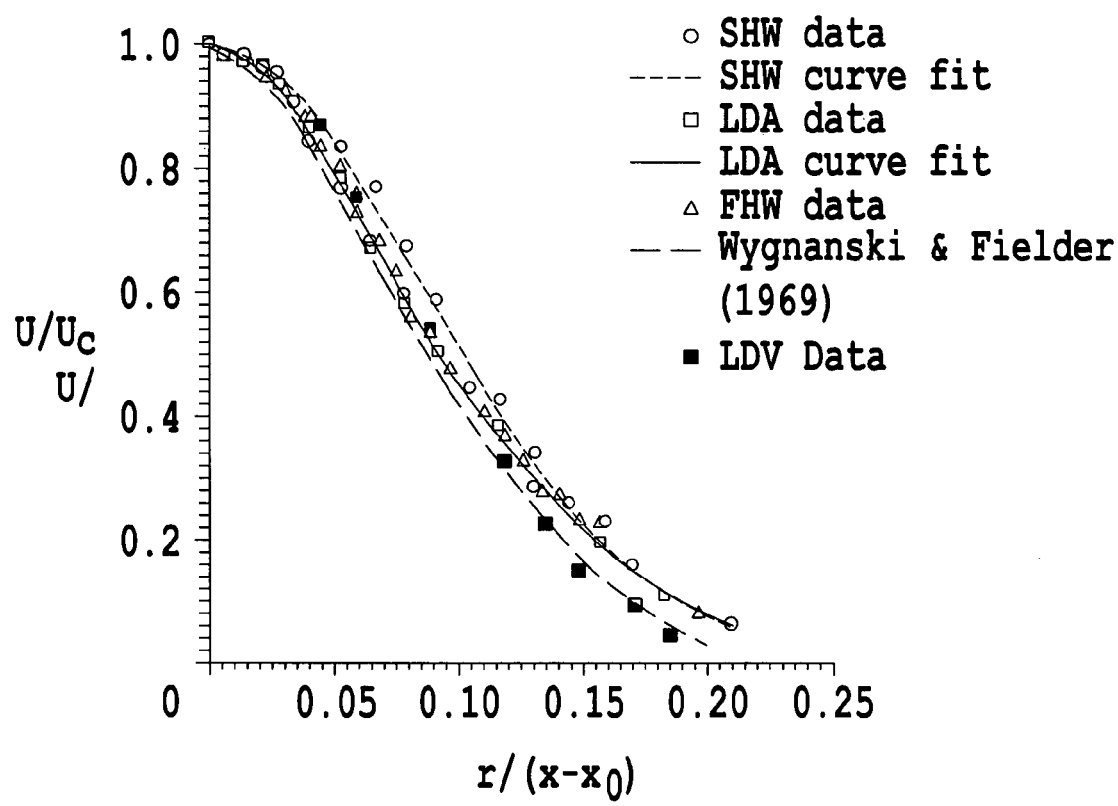
FIG. 7 illustrates the variation of mean axial velocity in the radial direction in the jet flow measurements illustrated in FIG. 5, including experimental data of other researchers.

FIG. 7. shows the normalized mean axial velocity variation with the non-dimensional radial coordinate, $\eta=r/(x-x_o)$. The LDV data is compared with hot-wire data of Wyganski & Fiedler, and the LDA data of Hussein et at. (Hussein, H. J., Capp, S., George, W. K., 1994, "Velocity measurements in a high-Reynolds-number, momentum-conserving, axisymmetric, turbulent jet", Journal of Fluid Mechanics, vol. 258, pp. 31-75, the entire contents of which are herein incorporated by reference). Present data show a very good agreement with the LDA data of Hussein et. al., near the jet center however, data becomes closer to the hot-wire data of Wygnanski & Fiedler near the edge of the jet.

Figure 8:
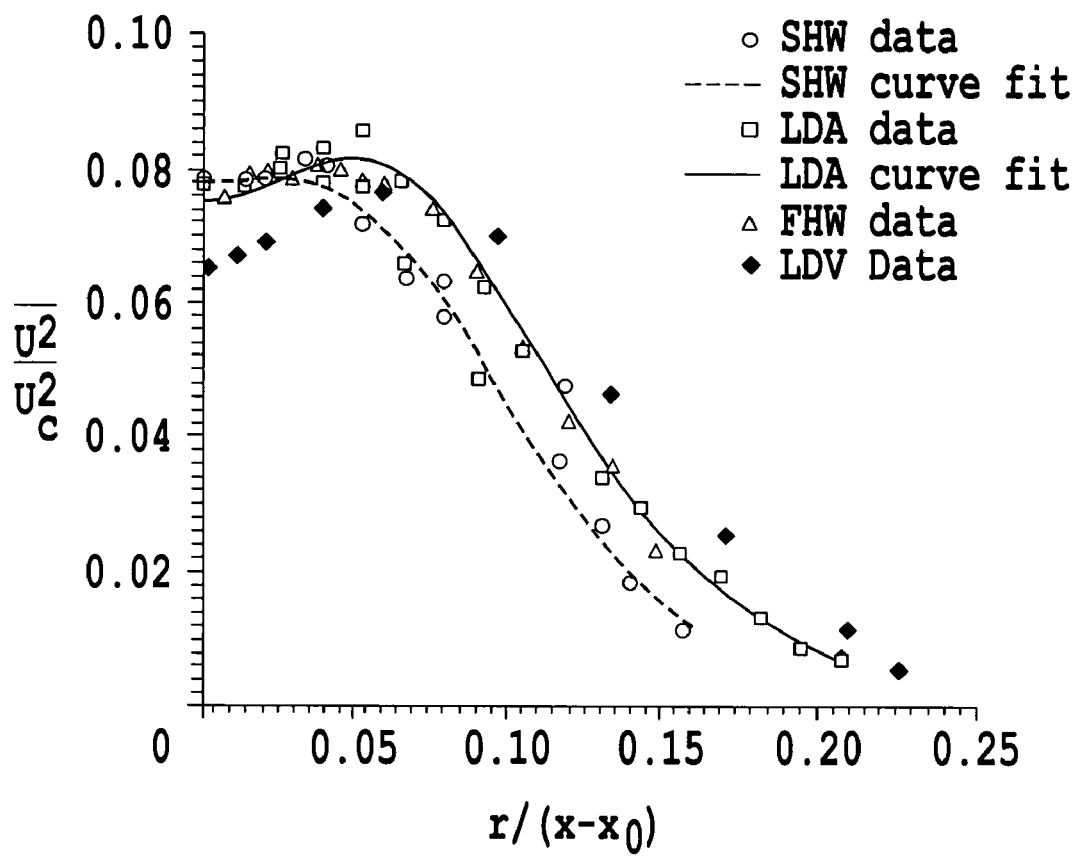
FIG. 8 illustrates the variation of axial component of turbulent kinetic energy in the jet flow measurements illustrated in FIG. 5, including experimental data of other researchers.
Figure 9:
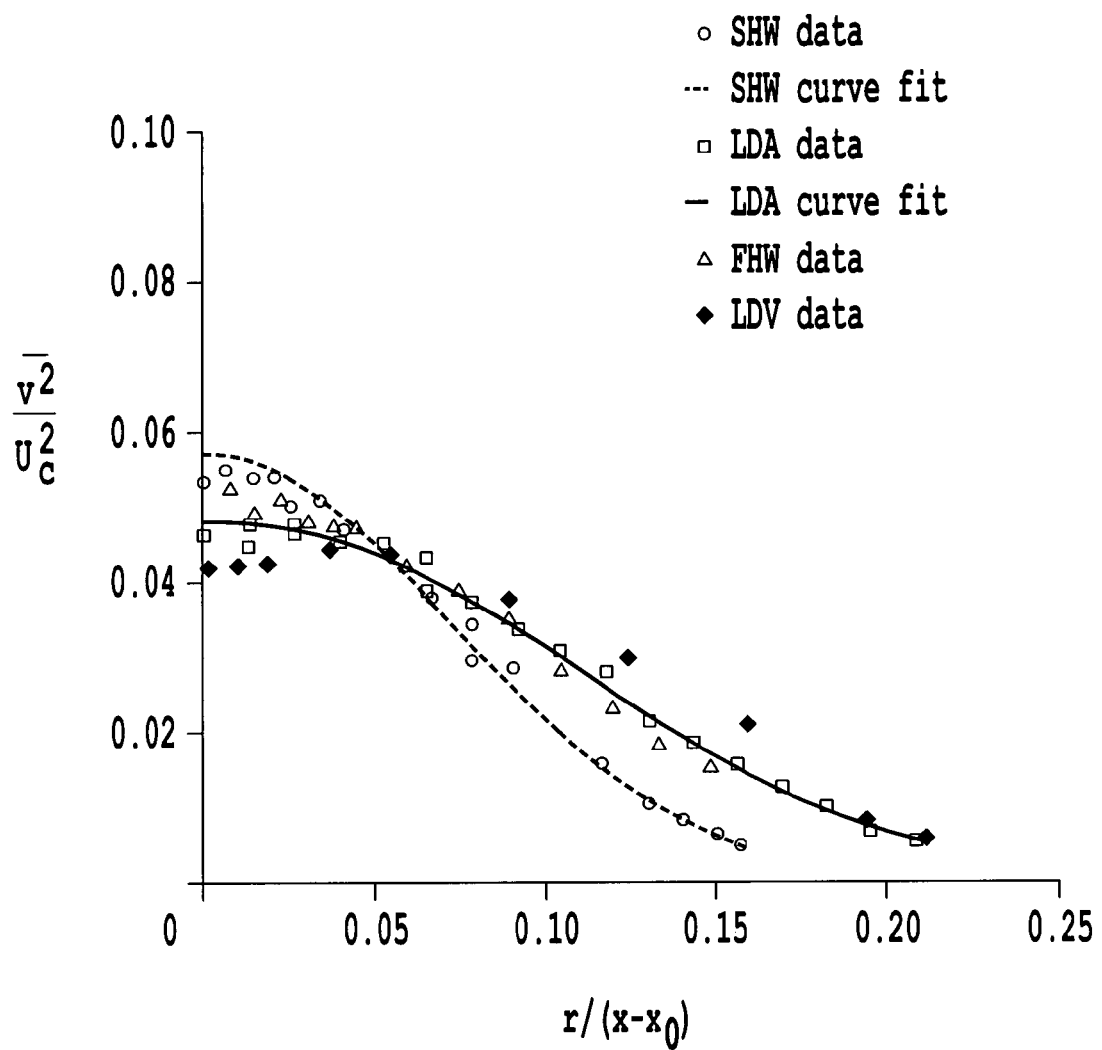
FIG. 9 illustrates the variation of radial component of turbulent kinetic energy in the jet flow measurements illustrated in FIG. 5, including experimental data of other researchers.
Figure 10:
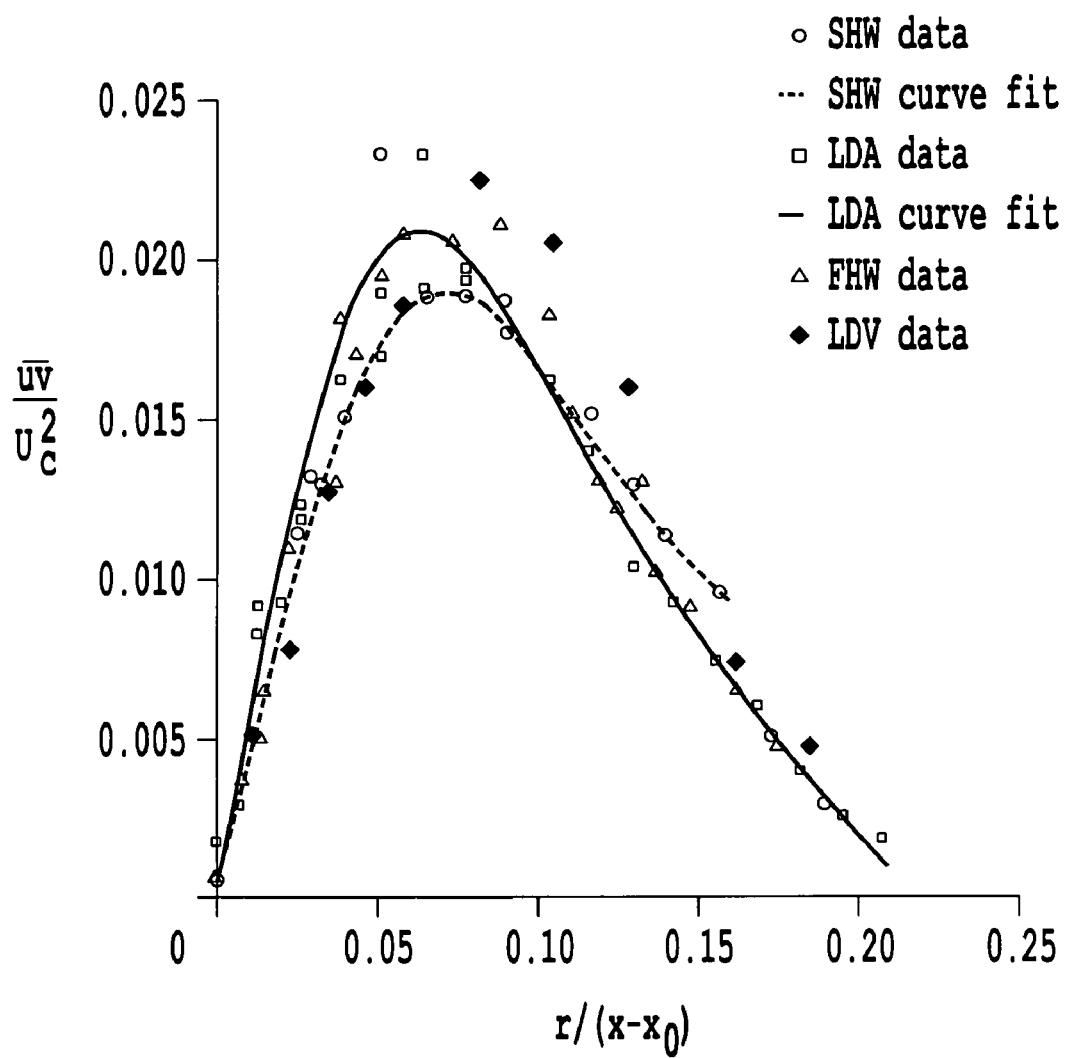
FIG. 10 illustrates the variation of turbulent shear stress in the jet flow measurements illustrated in FIG. 5, including experimental data of other researchers.

The variation of Reynolds Stresses is also investigated in this study. The normal stresses $\overline{u^2}, \overline{v^2}$, and shear stress $\overline{uv}$ are first normalized by centerline velocity of the jet, an plotted versus the non-dimensional radial coordinate. Plots are shown from FIGS. 8=10.

Stress variations follow the expected trends that all the stresses reduce to the zero value at the jet boundary and that the $\overline{uv}$ stress attains a zero value at the centerline of the jet. The normal stress values follow the trend of the previous data and reach maxima at $r/(x-x_0)=0.05$. This location also is the location where the turbulent-kinetic energy rate production is maximum since the radial gradient of the axial mean velocity shows a maximum also at this point. The variation of the data from the previous data is believed to be within the uncertainty bands including the uncertainty of the previous and the present data sets. Additionally the jet flows studied differ from each other in the sense that Hussein used a jet emerging from a converging nozzle where the size of the facility might have contributed to the growth of the boundary layer prior within the nozzle, and had some influence on the further development of the jet especially the shear layer flow near the jet edge.

Figure 11:
FIG. 11 shows photographs of one embodiment of the optical probe of the invention by itself, attached to an engine, and a photograph of an encoder attachment.

As previously mentioned, the above-described embodiment of the probe of the invention was also tested in an automobile engine. FIG. 11 details the specifications of the engine used during the study. This figure also shows the probe, the encoder and the probe attached on to the engine during engine studies. During the engine studies the probe was inserted into a copper tubing to hold the probe and to make the probe accessible to the spark-plug location. The copper tubing was attached to the traversing mechanism (National Aperture MM-3M-EX-2) and the traversing mechanism was held by a fixture that was glued to the cylinder head. Attaching the fixture to the cylinder head resulted in the probe to move together with the engine. Allowing the probe to move together with the engine, the position of the probe was therefore fixed with respect to the engine.

For the engine experiments an ordinary spark plug was machined to remove the prong generating the spark. The spark plug was next machined to allow placing the sapphire insert plate to the end of the plug. Insert plate was glued using epoxy to the spark plug. The hollow spark-plug was screwed to the spark-plug port and the engine was run approximately an hour to ensure that the sapphire insert plate could stand the pressures and temperatures of the operating engine so that the probe that would sit right behind the sapphire insert plate would not get damaged during the experiments.

Preliminary experiments using the probe were made on a 1997 Honda-Civic-LX car engine under idle conditions (600-700 RPM). The probe accessed into the engine through one of its spark plugs thus there was no ignition in that particular cylinder. An encoder was attached to the engine's crank shaft to infer the position of the piston within the cylinder. Single velocity component measurements were made at 10 mm and at 36 mm away from the sapphire insert plate along the cylinder axis. The spark plug tip sits at 6 mm away from the insert glass. Flow in the cylinder was seeded using a TSI-atomizer to generate fine particles of Di-Octyl-Phtalate of 0.7 μm in size. The seeder output was fed into the air intake of the engine.

Figure 12:
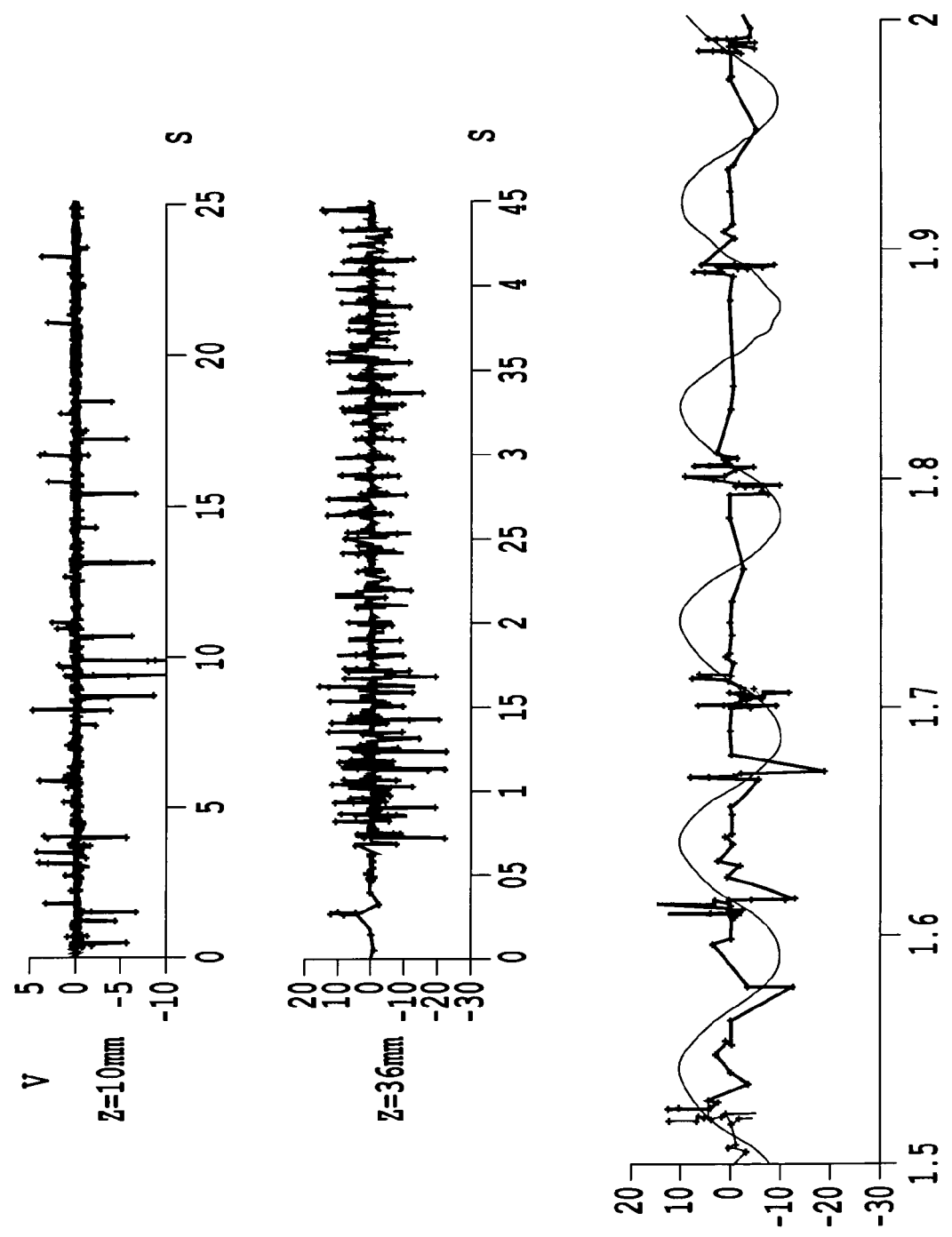
FIG. 12 illustrates in-cylinder, time-dependent velocity measurements at z=10 mm and at z=36 mm locations along the cylinder axis away from a sapphire insert plate obtained in an automobile engine. The bottom graph shows a detailed portion of the 36 mm data.

FIG. 12 shows some representative data obtained during the experiments. The results show that the velocity near the spark-plug location does not experience the large fluctuations observed farther into the engine. The last figure in FIG. 12 is the z=36 mm data plotted for a shorter time period and the sine wave denotes the output of the encoder. In each period of the sine wave the crank shaft completes a one full turn, while the piston moves from bottom-dead center to top-dead center and returns back to the bottom-dead center. The encoder data and the velocity data acquisitions were not simultaneously started in these measurements. Therefore the velocity data could not be resolved into defining the turbulence quantities with respect to the piston motion. Nevertheless the data shows the presence of periodic velocity values and the cycle-to-cycle variation of the velocity.

The data obtained gave an indication of the number of samples required in such measurements to be higher than presently obtained values. As shown in FIG. 12 the piston completes one full stroke up and one full stroke down motion within about 0.1 seconds completing a 3608 crank-shaft turn. In order to obtain 10 points within each 0.18 of the turn a data rate of approximately 36,000 samples per second would be required, which is well above the current obtained data rates.

Reflections from the focusing lens, from the probe surfaces, and from the piston generating undesired light levels at the photo-multiplier tube may be removed or minimized by simply anodizing the probe so as to control the diffuse light reflecting from the probe itself. During measurements when the sapphire insert window may bet dirty quickly due to the presence of oil and gas mixture within the piston, measurements may be made by emptying the oil of the car and by stopping the fuel injection, thus helping to increase the duration of the experiments.

Development of a two-component miniature, fiber-optic laser-Doppler velocimetry probe for measurements in an operating commercial car engine has been detailed. The probe has been shown to measure correct velocities using a jet flow and the previously published data. The probe was next used on an operating Honda-CIVIC-1997 engine to obtain data at couple of locations along the cylinder axis of the engine. The data show that the probe captures the cycle-to-cycle variation of the velocity field, however higher data rates are required to capture the true variation of the velocities. Data show that the velocity values are much higher than the values near the spark-plug location during idle operation.

Although the above-summarized embodiments have been directed to an LDV probe for the measurements of two-component velocities inside a cylinder of an IC engine up to 50 mm into the cylinder, those of ordinary skill in the art will understand that within the scope of the claimed invention, other applications include, but are not limited to, three-simultaneous velocity component measurements up to 50 mm into the cylinder along the cylinder axis, three-simultaneous velocity components during combustion along the cylinder axis up to 50 mm into the cylinder, and three-simultaneous velocity components during or without the combustion at selected radial locations and selected axial locations within the cylinder. The probe can be further used for species identification, concentration and temperature measurements using the same probe shape and size but by changing the transmitting and receiving optical fibers, using the laser-induced breakdown spectroscopy, laser-induced incandescence, coherent-anti-Raman spectroscopy and laser-induced florescence techniques.

Conventional technology allows measurements of a single flow velocity component within the IC engines at a fixed location along the cylinder axis. Additionally currently existing other probes are made to fit into M14 spark plug ports. Advantageous features of the optical probe of the invention described herein include, but are not limited to, miniaturized size so it fits into M8 spark plug port (the most common spark plugs used in conventional cars); traversable, so that the probe can be traversed 50 mm into the cylinder; and multi-component, so that the probe can measure the two-components of the velocity simultaneously. The design of the probe also allows the third component of the velocity measurement capability to be incorporated without changing the shape and size of the probe. The probe can be also used during firing conditions within the cylinder if the probe is accessed into the engine through a port other than the spark plug. These techniques can be used on an operating vehicle, while most of the previous techniques required optically accessible engines. The size of the probe makes it suitable for measurements in wind tunnel applications, which the probe may be required to be placed in the test model.

In addition, LDV techniques using the probe of the invention could be used in measuring flow velocity in different applications, such as in Civil, Mechanical, Aerospace Engineering fields and in Automotive, Maritime, Aerospace industries. A miniaturized, standalone, portable equipment that can be used as a handheld device for measuring velocity is also within the scope of the invention.

As previously explained, one of the advantageous characteristics of the probe of the invention is that it may access into the engine through its spark plug opening, thus resulting in cold flow velocity measurements. However, those of ordinary skill in the art will understand after consideration of this disclosure that the optical probe may also obtain access into the engine through an opening which may be drilled at a nearby location to the engine's spark plug. Also, as previously mentioned, third component of the velocity vector may be measured using the existing probe design together with a data reduction method appropriate for such measurements.

With such a laser-based probe it is possible to investigate the flow field characteristics under different operating conditions both in hot and cold flow conditions. In one preferred embodiment, the laser-based probe may be used as a corner stone in development of a unique portable standalone diagnostic tool which can simultaneously measure temperature, species concentration and velocity within a working car engine on the road. Techniques such as the laser-induced incandescence, Raman spectroscopy, and laser-induced fluorescence could be easily employed with additional equipment using a probe within the scope of the disclosed invention. Such a probe will be capable of: (1) measuring three-simultaneous velocity components; (2) fitting into a M8 spark plug port; (3) being traversable along the spark-plug axis for measurements up to 50 mm; (4) being strong to withstand the temperatures and pressures experienced in a production car engine without the need for cooling; (5) measuring all six components of the Reynolds stresses both in cold and hot flows; (6) being designed using off-the shelf optics; and (7) having no moving parts which makes the probe suitable for cramped spaces, and vibrating environments. Such an optical diagnostics probe is capable of measuring the velocity vector and other quantities as explained within a commercial working car engine in multiple locations under hot-flow conditions. Measurement of a third velocity component allows deduction of all of the six Reynolds' stresses, compared to only three stress measurement capability using a two-component LDV probe, thus allowing the measurement of complete information about the turbulent flow field within the engine or in any other environment.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

In addition, while the present invention has been shown in the drawings and fully described above with particularity and detail in connection with what is presently deemed to be practical and several of the preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

Recapitulating, a fiber-optic probe configured to make flow-related measurements inside a cylinder of an automobile engine during normal operations is disclosed comprising: an external body configured to be inserted into an access port in the engine; a transparent window disposed in the external body; a traversable middle section inserted through the external body; and a data acquisition system. The middle section further comprises receiving and transmitting fibers connected to a fiber terminator, a transmitting lens to focus a laser light from the transmitting fiber so as to form a probe volume formed inside the engine beyond the transparent window, and a receiving lens to focus a scattered light from the probe volume into the receiving fiber, the data acquisition system being connected to the receiving fiber via a fiber-optic cable and configured to compute the flow-related measurements from the light scattered from the probe volume.

In the above-summarized fiber-optic probe, the transmitting fiber may comprise a plurality of transmitting fibers, the middle section may comprise a plurality of collimating lens disposed between the fiber terminator and the transmitting lens, each collimating lens from the plurality of collimating lens being configured to collimate the laser light from the corresponding transmitting fiber from the plurality of transmitting fibers, and the flow-related measurements being measurements of at least two components of a velocity vector of a gas flow field inside the engine. In addition, the flow-related measurements may be measurements of three components of a velocity vector. Furthermore, the probe may also be a non-cooled probe.

In another embodiment of the fiber-optic probe, the external body may comprise external threads on the external surface thereof, the external body may be threaded into the access port in the engine, the access port may be a spark plug hole, and the external body may be a machined spark plug, which may be a hole for an M8 spark plug or any other spark plug.

The fiber-optic probe within the scope of the disclosed invention may have the middle section made of anodized aluminum and it may also be configured to be: (1) a LIF probe and the flow-related measurements may comprise chemical-composition measurements of a gas inside the cylinder of the engine; (2) a LII probe and the flow-related measurements comprise property measurements of soot particles within the probe volume; or (3) a CARS probe and the flow-related measurements comprise temperature measurements of a gas inside the cylinder of the engine. In all embodiments of the probes within the scope of the invention disclosed, the middle section may be made to be traversed with respect to the middle section along an axial direction of the external body and the flow-related measurements may be spatially resolved by as much as 50 mm with respect to the middle section.

What is claimed is:

1. A fiber-optic probe configured to make flow-related measurements inside a cylinder of an automobile engine during normal operations, the probe comprising:
    an external body having an external surface and first and second end portions, the external body being configured to be inserted into an access port in the engine;
    a transparent window inserted in the first end portion of the external body; and
    a middle section inserted through the second end portion of the external body, the middle section having first and second ends, being traversable with the respect to the external body, and comprising,
    receiving and transmitting fibers connected to a fiber terminator disposed on the first end of the middle section,
    a transmitting lens disposed in the second end of the middle section, the transmitting lens being configured to focus a laser light from the transmitting fiber into a probe volume formed inside the engine beyond the transparent window, and
    a receiving lens configured to focus a scattered light from the probe volume into the receiving fiber; and
    a data acquisition system connected to the receiving fiber via a fiber-optic cable, the data acquisition system being configured to compute the flow-related measurements from the light scattered from the probe volume.

2. The fiber-optic probe according to claim 1, wherein the probe is a non-cooled probe.

3. The fiber-optic probe according to claim 1, wherein the middle section is made of anodized aluminum.

4. The fiber-optic probe according to claim 1, wherein the fiber-optic probe is a LIF probe and the flow-related measurements comprise chemical-composition measurements of a gas inside the cylinder of the engine.

5. The fiber-optic probe according to claim 1, wherein the fiber-optic probe is a LII probe and the flow-related measurements comprise property measurements of soot particles within the probe volume.

6. The fiber-optic probe according to claim 1, wherein the fiber-optic probe is a CARS probe and the flow-related measurements comprise temperature and species composition measurements of a gas inside the cylinder of the engine.

7. The fiber-optic probe according to claim 1, wherein the transmitting fiber comprises a plurality of transmitting fibers, the middle section comprises a plurality of collimating lens disposed between the fiber terminator and the transmitting lens, each collimating lens from the plurality of collimating lens being configured to collimate the laser light from the corresponding transmitting fiber from the plurality of transmitting fibers, and the flow-related measurements are measurements of at least two components of a velocity vector of a gas flow field inside the cylinder of the engine.

8. The fiber-optic probe according to claim 7, wherein the flow-related measurements are measurements of three components of the velocity vector.

9. The fiber-optic probe according to claim 1, wherein the external body comprises external threads on the external surface thereof and the external body is threaded into the access port in the engine.

10. The fiber-optic probe according to claim 9, wherein the access port is a spark plug hole.

11. The fiber-optic probe according to claim 10, wherein the spark plug hole is a hole for an M8 spark plug.

12. The fiber-optic probe according to claim 1, wherein the external body is a machined spark plug.

13. The fiber-optic probe according to claim 12, wherein the access port is a spark plug hole.

14. The fiber-optic probe according to claim 13, wherein the spark plug hole is a hole for an M8 spark plug.

15. The fiber-optic probe according to claim 1, wherein the middle section is traversed with respect to the middle section along an axial direction of the external body and the flow-related measurements are spatially resolved.

16. The fiber-optic probe according to claim 15, wherein the middle section is traversed 50 mm with respect to the middle section.

17. A fiber-optic probe configured to make flow-related measurements inside the cylinder of an automobile engine during normal operations, the probe comprising:
    an external body having an external surface and first and second end portions, the external body being configured to be inserted into an access port in the engine;
    a transparent window inserted in the first end portion of the external body; and
    means for traversably making the flow-related measurements inside the cylinder of the engine, wherein the means for traversably making the flow-related measurements inside the cylinder are configured to freely move with respect to the external body.

18. The fiber-optic probe according to claim 17, wherein the fiber-optic probe is a probe selected from the group consisting of an LDV probe, a LIF probe, a LII probe, and a CARS probe.

19. A multi-component LDV fiber-optic probe configured to make gas velocity measurements inside a cylinder of an automobile engine during normal operations, the multi-component LDV probe comprising:
    an external body having an external surface and first and second end portions, the external body being configured to be inserted into an access port in the engine;
    a transparent window inserted in the first end portion of the external body; and
    a middle section inserted through the second end portion of the external body, the middle section having first and second ends and comprising,
    a receiving fiber and a plurality of transmitting fibers connected to a fiber terminator disposed on the first end of the middle section,
    a transmitting lens disposed in the second end of the middle section, the transmitting lens being configured to focus laser beams from the plurality of transmitting fibers into a probe volume formed inside the engine beyond the transparent window,
    a plurality of collimating lens disposed between the fiber terminator and the transmitting lens, each collimating lens from the plurality of collimating lens being configured to collimate the laser light from the corresponding transmitting fiber from the plurality of transmitting fibers, and
    a receiving lens configured to focus a scattered light from the probe volume into the receiving fiber; and
    a data acquisition system connected to the receiving fiber via a fiber-optic cable, the data acquisition system being configured to compute a plurality of components of a velocity vector of a gas inside the cylinder of the engine from the light scattered from the probe volume.

20. The multi-component fiber-optic probe according to claim 19, wherein the plurality of components of the gas velocity vector comprises three components.

21. The multi-component fiber-optic probe according to claim 19, wherein the probe is a non-cooled probe.

22. The multi-component fiber-optic probe according to claim 19, wherein the middle section is made of anodized aluminum.

23. The multi-component fiber-optic probe according to claim 19, wherein the middle section is traversable with respect to the external body.

24. The fiber-optic probe according to claim 23, wherein the middle section is traversed with respect to the middle section along an axial direction of the external body and the gas velocity measurements are spatially resolved.

25. The fiber-optic probe according to claim 24, wherein the middle section is traversed 50 mm with respect to the middle section.

26. The multi-component fiber-optic probe according to claim 19, wherein the external body comprises external threads on the external surface thereof and the external body is threaded into the access port in the engine.

27. The multi-component fiber-optic probe according to claim 26, wherein the access port is a spark plug hole.

28. The multi-component fiber-optic probe according to claim 27, wherein the spark plug hole is a hole for an M8 spark plug.

29. The multi-component fiber-optic probe according to claim 19, wherein the external body is a machined spark plug.

30. The multi-component fiber-optic probe according to claim 29, wherein the access port is a spark plug hole.

31. The multi-component fiber-optic probe according to claim 30, wherein the spark plug hole is a hole for an M8 spark plug.

32. A method of making flow-related measurements inside a cylinder of an automobile engine during normal operations with a fiber-optic probe, the method comprising:

providing the automobile engine;

inserting the optic probe into the access port in the engine, the optic probe comprising an external body having an external surface and first and second end portions, the external body being configured to be inserted into an access port in the engine; a transparent window inserted in the first end portion of the external body; a middle section inserted through the second end portion of the external body, the middle section having first and second ends, being traversable with the respect to the external body, and comprising, receiving and transmitting fibers connected to a fiber terminator disposed on the first end of the middle section, a transmitting lens disposed in the second end of the middle section, the transmitting lens being configured to focus a laser light from the transmitting fiber into a probe volume formed inside the engine beyond the transparent window, and a receiving lens configured to focus a scattered light from the probe volume into the receiving fiber; and a data acquisition system connected to the receiving fiber via a fiber-optic cable, the data acquisition system being configured to compute the flow-related measurements from the light scattered from the probe volume;

operating the automobile engine during normal operations;

shinning the laser light through the transmitting fiber;

collecting the scattered light from the probe volume with the data acquisition system;

and computing with the data acquisition system the flow-related measurements based on the light scattered received by the data acquisition system via the fiber-optic cable.

\* \* \* \* \*